(12) United States Patent
Masuzawa et al.

(10) Patent No.: US 7,165,849 B2
(45) Date of Patent: Jan. 23, 2007

(54) PROJECTOR WITH AUTO FOCUS DEVICE

(75) Inventors: Tomonari Masuzawa, Saitama (JP); Yasuhiro Miwa, Saitama (JP); Tatsuo Saito, Saitama (JP); Takao Araki, Saitama (JP)

(73) Assignee: Fujinon Corporation, Saitama (JP)

( * ) Notice: Subject to any disclaimer, the term of this patent is extended or adjusted under 35 U.S.C. 154(b) by 189 days.

(21) Appl. No.: 10/979,199

(22) Filed: Nov. 3, 2004

(65) Prior Publication Data
US 2005/0099609 A1   May 12, 2005

(30) Foreign Application Priority Data
Nov. 6, 2003   (JP) .............................. 2003-377430

(51) Int. Cl.
*G03B 21/00* (2006.01)
*G03B 3/00* (2006.01)

(52) U.S. Cl. ........................................ 353/101; 353/69

(58) Field of Classification Search ................ 353/69, 353/70, 100, 101
See application file for complete search history.

(56) References Cited

U.S. PATENT DOCUMENTS 5,455,647 A * 10/1995 Fujiwara ..................... 353/101

FOREIGN PATENT DOCUMENTS

| JP | 5-346569 | 12/1993 |
|---|---|---|
| JP | 2003-161869 | 6/2003 |

\* cited by examiner

*Primary Examiner*—Rodney Fuller
(74) *Attorney, Agent, or Firm*—Arnold International; Bruce Y. Arnold

(57) ABSTRACT

An image displayed on a liquid crystal panel is projected on a projection surface by a projection lens such that the optical axis of the projection lens is perpendicular to the projection surface. An optical axis of a distance measurement light and an optical axis of a light receiving lens are each inclined a specified angle with respect to the optical axis of the projection lens to be not perpendicular to the projection surface so as to reduce noise caused by specularly reflected light that otherwise would be detected by the distance measurement unit when a highly reflective whiteboard is utilized as the projection surface. The distance measurement unit is formed by unitizing a light emitting element, a light emitting lens, the light receiving lens, and a light receiving element, and the distance measurement unit is held with the projection lens by a common holder.

11 Claims, 7 Drawing Sheets

PROJECTOR WITH AUTO FOCUS DEVICE

BACKGROUND OF THE INVENTION

1. Field of the Invention

The present invention relates to a projector having an auto focus device.

2. Description Related to the Prior Art

Many kinds of projectors for projecting images to a screen such as a slide projector and a liquid-crystal projector are utilized. In back projection type projectors which incorporates the screen, there is no need to perform focusing of a projection lens for every use because a distance between the projection lens and the screen stays constant. However, in general projectors which projects images from front side of the screen, there is need to perform focusing of a projection lens according to the distance between the projection lens and the screen.

The projectors which incorporate an auto focus device to enable the automatic focusing of the projection lens are disclosed in Laid-Open Japanese Patent Applications 5-346569 and 2003-161869. As the auto focus device of the projector, it is often used that an active type distance measurement device which measures the distance between the projection lens and the screen by triangulation such that the device projects a distance measurement light to the screen which is the projection surface for the image and receives the diffuse reflected light from the screen.

As shown in FIG. 6, in general the projector 2 is mounted on a table 3, and the screen 4 is often set at high place so that the projected image can be seen easily. In this case, if the whole projector 2 is inclined upward for adjusting the center of the projected image and center of the screen 4, the projected image becomes a trapezoid shape because the image is expanded in the upper part of the screen. To avoid this problem, in the figure, the projection lens 5 is shifted upward with respect to center of a liquid crystal panel 6 which displays images for projecting with that the optical axis 5a of the projection lens 5 is horizontal (perpendicular to the screen 4). Accordingly, the strain-free image can be projected on the screen 4, in spite of that an optical axis 5b of center of the image, which connects the center of the liquid crystal panel 6 and the center of the screen 4, is inclined upward with respect to an optical axis 5a of the projection lens 5.

In the active type distance measurement device used in Laid-Open Japanese Patent Applications 5-346569 and 2003-161869, as described in FIG. 7, near-infrared light from an infrared emitting diode (IRED) 10 is projected to the projection surface 9 through a light emitting lens 11. In case that the screen is used as the projection surface 9, an spot image (spot area S1) is formed on the surface of the screen by irradiation of the distance measurement light, because the surface is fine coarse and has diffusion reflection property. A light receiving lens 12 is provided at a position distant from center of the light emitting lens by a base length L. The diffuse reflected light from the spot area S1 enters to the light receiving lens 12, and an spot image is focused on a photoelectric surface of a light receiving element 13 provided back of the light receiving lens 12. Note that it only needs that the spot image on the screen is in a field angle of the light receiving lens 12. Therefore, there is no need that an optical axis 12a of the light receiving lens 12 is parallel to an optical axis 11a of the light emitting lens 11, even though there often be a case that an optical axis 12a of the light receiving lens 12 is parallel to an optical axis 11a of the light emitting lens 11, as described in the figure.

In general, a PSD (Position Sensitive Detector) is used as the light receiving element 13, which outputs a pair of electrical signals corresponding to a position (center of gravity) of the spot image imaged by the light receiving lens 12. The PSD has a function to discriminate the position of incidence of light in direction of the base length L, and the image forming position of the spot image on the photoelectric surface corresponds to the distance between the projection lens and the screen by triangulation. Therefore, a distance measurement signal corresponding to the distance between the projection lens and the screen can be generated based on the pair of electrical signals from the PSD, with being immune to amount of light entered into the PSD. The automatic focusing is operated such that a focus motor is driven according to the distance measurement signal to move a focus lens of the projection lens system in direction of the optical axis 5a.

Recently, whiteboards are often used as a substitute for the screen when the projector is used in offices. The whiteboard has a surface which is smoother and has higher reflectivity than the normal screen having diffusion reflection property, to enable writing down by markers and erasing by erasers. Accordingly, the distance measurement light emitted from the distance measurement device is reflected at a considerably high intensity at the whiteboard and enters into the light receiving element 13. In this time, the distance measurement light from the light emitting lens 11 to the projection surface 9 includes not only the effective distance measurement light formed as a beam. Because the light emitting lens 11 is not absolutely transparent to near-infrared light, the light emitting lens 11 emits diffused light with the effective distance measurement light. In addition, diffuse reflected light is often emitted from for example components mounted back of the light emitting lens 11.

As shown in FIG. 7, most of these noise lights are emitted with gradation of intensity as high as closer to a center of a surrounding area S2 which surrounds the spot area S1 to which the effective distance measurement light is emitted, and as low as closer to a periphery of the surrounding area S2. Ordinarily, the intensity of the noise light is very lower than that of the effective distance measurement light, therefore the noise light from the surrounding area S2 hardly reaches to the light receiving lens 12 when the normal screen is used as the projection surface 9. However, when the whiteboard is used, part of the noise light which is emitted to the surrounding area S2 becomes to have many components which are regularly reflected at the surface of the whiteboard (the light which has an exit angle being equal to an incidence angle). As shown in figure as "regularly reflected noise light", part of diffused light reaches to the light receiving element 13 by entering into the light receiving lens 12 at an angle different from that of the effective distance measurement light with being little attenuated. As described above, the PSD which is often used as the light receiving element 13, outputs electrical signals corresponds to the incidence position of the distance measurement light with being immune to intensity of the distance measurement light, therefore the noise light becomes a major factor of erroneous distance measurement.

Even if the case that other photoelectric sensors are used as the light receiving element 13, it is also difficult to distinguish the distance measurement light and the noise light according to the intensity of the distance measurement light, because the normal screen or the whiteboard is used as the projection surface 9 according to situations, and the distance from the projector is different in different cases. In addition, measures for erroneous distance measurement from the noise light rises cost of the projector.

As an example of the distance measurement is executed with the condition that the distance between the projector and the whiteboard is 1 meter, and the light emitting optical axis 11a and the optical axis 12a of the light receiving lens 12 are parallel to the optical axis 5a of the projection lens 5, and with inclining the projector upward and downward. In FIG. 8, a horizontal axis represents projective angle of the projection lens to the whiteboard, in which the condition that the optical axis 5a of the projection lens 5 and the optical axis 11a of the light emitting lens 11 is perpendicular to the whiteboard is shown at [0°], the condition that the optical axis 11a is inclined mostly upward with respect to the whiteboard is shown at [−10°], and the condition that the optical axis 11a is inclined mostly downward with respect to the whiteboard is shown at [10°]. A vertical axis represents digital value of distance signal (larger value corresponds to shorter distance) calculated based on the signal from the light receiving element (PSD) 13, each value corresponds to the distance to the whiteboard one to one.

Because the distance between the whiteboard and the projector is constant at 1 meter, the distance signal is expected to be constant value (≈4875) even if the projection angle is changed. However, when the projection angle is between [−2°] and [3°], the distance signal abnormally depends on the projection angle, even though the mostly constant distance signal is obtained when the projection angle is more than 3° in upward or downward direction. The fact means that when the light emitting optical axis 11a is inclined at [−2° to 3°] with respect to the whiteboard, the possibility of occurring the erroneous distance measurement becomes high.

SUMMARY OF THE INVENTION

A main object of the present invention is to provide a projector whose distance measurement device for determining focusing point of a projection lens does not perform erroneous distance measurement even when a surface like a whiteboard which has high surface reflectance is used as a screen.

Another object of the present invention is to reduce a cost of manufacturing a projector by making setting up of the projector more efficient.

In order to achieve the object and the other object, the projector of the present invention comprises an active type distance measurement device which obtains distance measurement data corresponding to a distance between a projection lens and a screen such that a light emitting element emits a distance measurement light through a light emitting lens to a projection surface on which projected image is displayed, and a light receiving element receives reflected light from the projection surface through a light receiving lens. In the distance measurement device, an optical axis of the distance measurement light and an optical axis of the light receiving lens are inclined to same direction with respect to an optical axis of the projection lens. It is preferable that the optical axis of the distance measurement light and the optical axis of the light receiving lens are inclined to a direction toward a center of the projected image.

It is also preferable that the distance measurement device is assembled as a unit and is held with the projection lens by a common holder.

The projector of the present invention can perform focusing of the projection lens with accuracy by accurate distance measurement with the active type distance measurement device even if whiteboards which has high reflectivity is used as the projection surface, because noise light does not affect the distance measurement.

In addition, it is easy to maintain relationship between the light emitting optical axis of the distance measurement light and the optical axis of the light receiving lens with respect to the optical axis of the projection lens, because the distance measurement device is assembled as the unit and is held with the projection lens by the common holder. This is effective to decrease the cost of manufacturing the projector.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
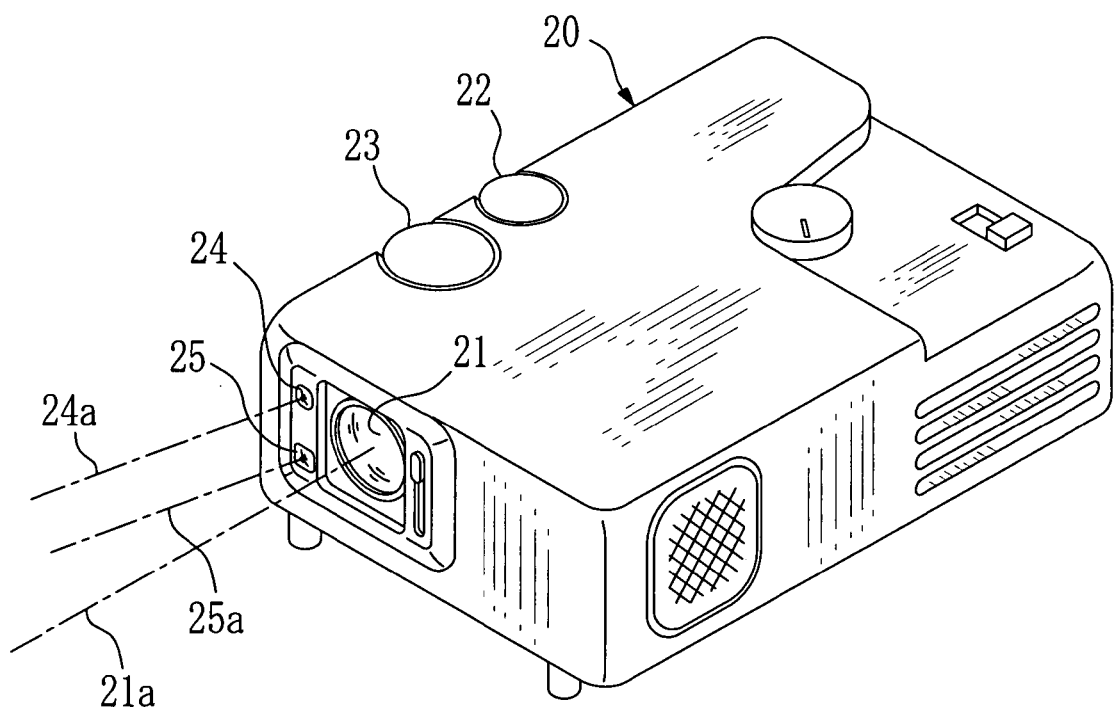
FIG. 1 is a perspective view of a projector of the present invention.

In a liquid crystal projector 20 shown in FIG. 1, projection lens 21 is exposed from an opening formed on front of a case when a lens cover is opened. Zooming and focusing the projection lens 21 can be operated manually by a zooming dial 22 and a focusing dial 23 which are provided on the case. A mark for automatic focusing is provided on the focusing dial 23. When the mark is faced with an index on the case, the projection lens 21 is focused automatically.

The case contains an active type distance measurement device and lens moving device which moves focus lens of the projection lens 21 based on distance measurement data obtained from the distance measurement device, so that the projection lens 21 can be focused automatically. Beside the projection lens 21, there are light emitting lens 24 and light receiving lens 25 of the distance measurement device, which are arranged vertically. Distance measurement light (near-infrared light) is emitted through the light emitting lens 24 to projection surface of the image along a fixed optical path, to form a spot image of the distance measurement light on the projection surface. The spot image is a distance measurement point. The distance measurement light from the spot image is received by a light receiving element described later, through the light receiving lens 25. Note that front of the light emitting and receiving lenses 24, 25 may be covered by filters having transparency to near-infrared light.

Figure 2:
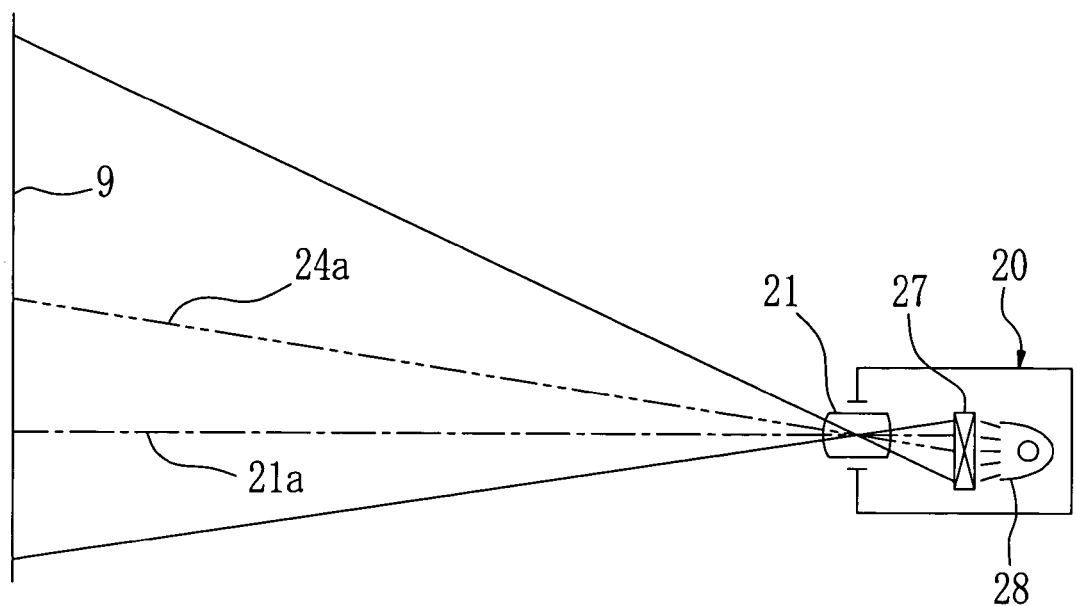
FIG. 2 is a conceptual diagram illustrating one embodiment of usage of the projector of the present invention.

When the projector 20 is placed horizontally on a mount surface such as a table, an optical axis 21a of the projection lens 21 is horizontal to the mount surface, and vertical to a projection surface 9 such as a screen as shown in FIG. 2. Center of the projection lens 21 is shifted above center of a liquid crystal panel 27 as an image displaying panel which displays images for projecting. Accordingly, the image displayed on the liquid crystal panel 27 is projected upwardly on the projection surface 9 when a projecting light source 28 is turned on, and the projected image on the projection surface 9 is strain-free. Note that a shift mechanism may be provided to control shift amount of the projection lens 21 according to vertical interval between the projection surface 9 and the projector 20.

A light emitting optical axis 24a of the distance measurement device and an optical axis 25a of the light receiving lens 25 are inclined upward with respect to the horizontal optical axis 21a of the projection lens 21. The light emitting optical axis 24a and the light axis 25a of the light receiving lens 25 can be inclined to any direction, however, it is practical to incline these optical axes upward as described above, so that a position where the distance measurement light is projected is not far away from the projected image. As described later in detail, the inclination angle θ is determined for preventing that noise light such as diffuse transmitted light from the light emitting lens 24 itself and diffuse reflected light from various components mounted back of the light emitting lens 24, which exist with the effective distance measurement light emitted from the light emitting lens 24 as a beam along the light emitting optical axis 24a, is emitted to the projection surface 9, and direct reflected light and diffuse reflected light from the projection surface 9 enter to the light receiving element 13 through the light receiving lens 25.

Figure 3:
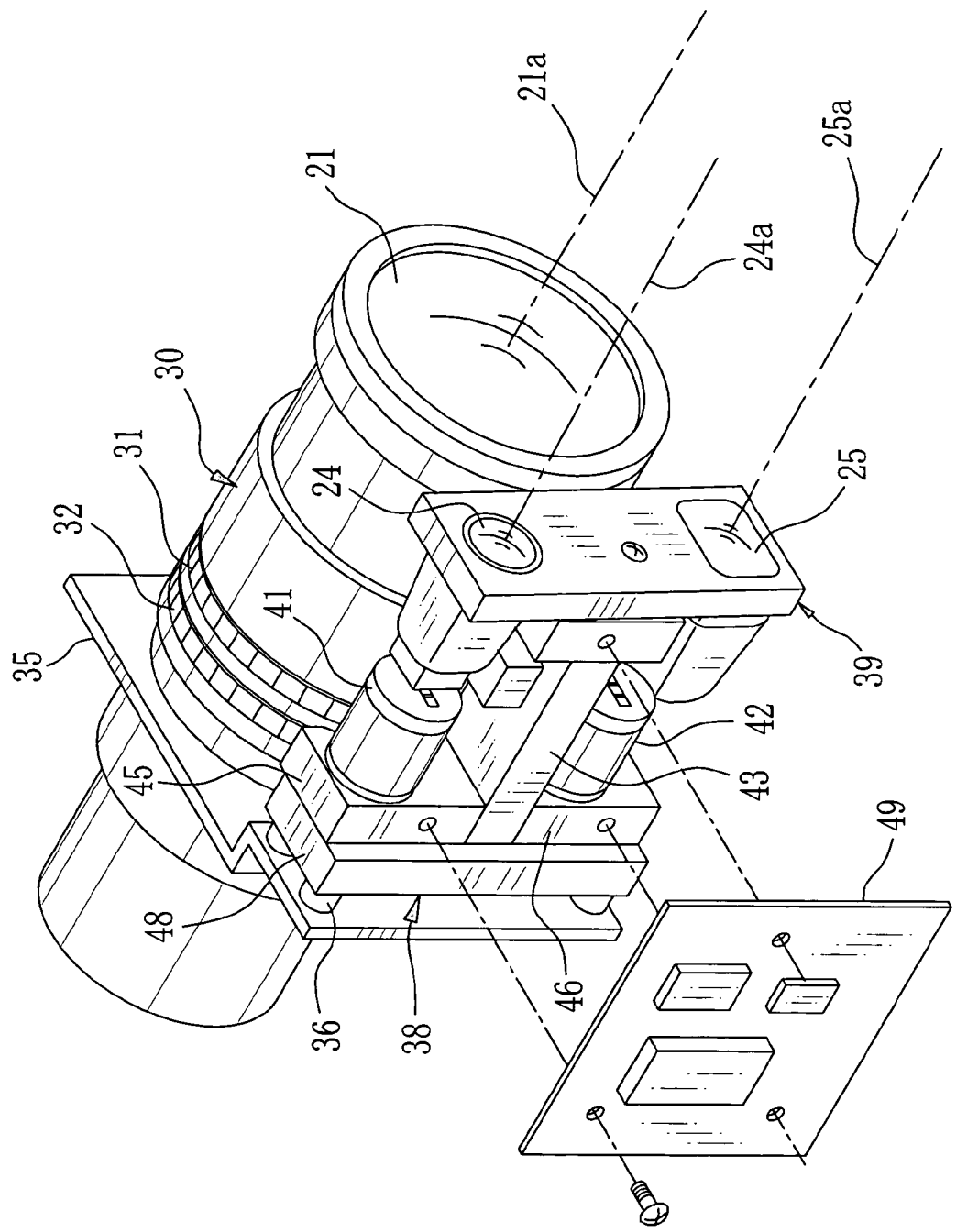
FIG. 3 is a perspective view of a projection lens unit of the projector.

As shown in FIG. 3, the projection lens 21 is constituted by zoom lens, which is contained in a barrel 30. A focus ring 31 and a zoom ring 32 are provided in the barrel 30. Focusing and zooming are performed by rotating these rings around the optical axis 21a. The barrel 30 is held by a holder plate 35 which is fixed to a base plate united with the case of the projector 20.

A lens driving unit 38 is fixed to the holder plate 35 by using bosses 36 for fixture. The lens driving unit 38 includes a distance measurement unit 39 which exposes the light emitting lens 24 and the light receiving lens 25 at front surface and installs IRED and PSD behind the light emitting lens 24 and the light receiving lens 25, a support plate 43 which holds the distance measurement unit 39 and mounts a focus motor 41 and a zoom motor 42 above and below the distance measurement unit 39, a focusing gear box 45 in which a drive gear and reduction gear system engaged with the focus ring 31 is installed, a zooming gear box 46 in which a drive gear and reduction gear system engaged with the zoom ring 32 is installed, and a encoder unit 48 which contains rotary encoders for detecting amounts of rotation of the focus motor 41 and the zoom motor 42. A circuit board 49 is attached to a side of the lens driving unit 38 by screws.

When setting up the lens driving unit 38, fixation between the distance measurement unit 39 and the support plate 43 is adjusted such that all of the light emitting lens 24, the IRED, the light receiving lens 25, and the PSD are inclined upward such that the light emitting optical axis 24a and the optical axis 25a of the light receiving lens 25 are inclined upward at the above stated inclination angle θ. Therefore, the light emitting optical axis 24a and the optical axis 25a of the light receiving lens 25 become inclined upward at the inclination angle θ with respect to the optical axis 21a of the projection lens 21 in spite of that the barrel 30 and the lens driving unit 38 are attached to the holder plate 35 at regular position. In addition, the drive gears can be accurately engaged with the focus ring 31 and the zoom ring 32 because the support plate 43 is kept in the regular position. Accordingly the setting up the lens driving unit 38 becomes efficient.

Figure 4:
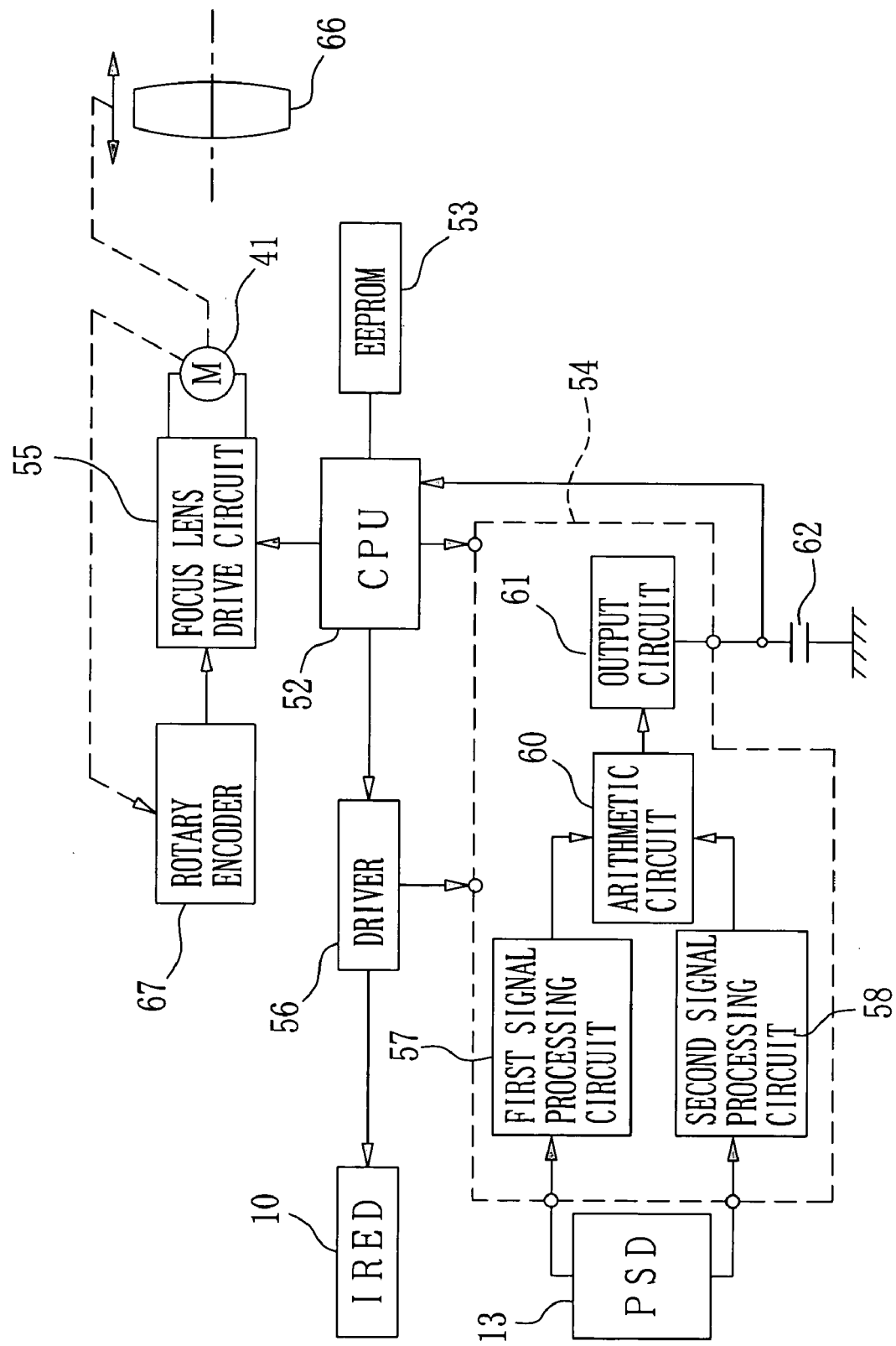
FIG. 4 is a block diagram illustrating electrical composition of an auto focus device.

As shown in FIG. 4, a CPU 52 reads in initial setting data and adjusting data written in an EEPROM 53, sends commands to a distance measurement IC 54, a focus lens drive circuit 55, and a driver 56, to control distance measurement process and focusing process entirely.

When the distance measurement process is started, the driver 56 send a light emitting command to the IRED 10. According to the light emitting command, the IRED 10 emits the distance measurement light. The distance measurement light reflected from the projection surface 9 enters to the light receiving element 13. An incidence position on the light receiving element 13 exclusively corresponds to a distance between the projector 20 to the projection surface 9. The PSD is used as the light receiving element 13, and outputs a pair of electrical signals to first and second signal processing circuits 57, 58. An arithmetic circuit 60 samples output signals from the first and second signal processing circuits 57, 58 in synchronization with the light emitting command from the driver 56, and calculates a distance measurement signal based on output ratio of the output signals. As described above, by using the output ratio of the pair of signals, stationary light components entering to the light receiving element 13 and intensity component of the distance measurement light are canceled each other. Accordingly, the distance measurement signal corresponds to the incidence position of the distance measurement light on the light receiving element 13 can be obtained.

An output circuit 61 accumulates the distance measurement signal outputted from the arithmetic circuit 60 in an integrating capacitor 62. For example when the IRED 10 emits the light hundred times according to the command from the driver 56, and the arithmetic circuit 60 samples hundred distance measurement signals in synchronization with that the IRED 10 emits the light, hundred distance measurement signals are accumulated in the integrating capacitor 62. The accumulated distance measurement signals are read into the CPU 52 via an A/D port. The CPU 52 obtains a distance signal which is not affected by noises, by calculating the average of the accumulated distance measurement signals. In addition, it can obtain more accurate distance signal by executing processes that these described distance measurement steps is operated as one distance measurement routine, the distance measurement routine is operated for example three times, and the three distance signals obtained by the each distance measurement routine are averaged, as one distance measurement process.

The CPU 52 outputs focus signal corresponding to the distance signal obtained by one distance measurement process to the focus lens drive circuit 55. The focus lens drive circuit 55 drives the focus motor 41 according to the inputted focus signal, to move the focus lens 66 which is part of the projection lens 21 from a home position. The driving of the focus motor 41 is monitored by the rotary encoder 67 contained in the encoder unit 48. The focus lens drive circuit 55 receives feedback signal from the rotary encoder 67, and stops the rotation of the motor 41 when the amount of rotation of the motor 41 is reached the predetermined amount of rotation corresponding to the focus signal from the CPU 52. Therefore, the focusing is completed such that the moving of the focus lens 66 is stopped at the position which corresponds one to one with the focus signal. Obviously, the driving and stopping the focus motor 41 may be also controlled by monitoring moving distance of the focus lens 66.

In addition, the moving of the focus lens 66 may be controlled manually by operating the focusing dial 23 manually and driving the focus motor 41 according to the operating amount of the focusing dial 23, with manually monitoring the focusing of the image projected on the projection surface 9. When the zooming dial 22 is operated manually, the zoom motor 42 is driven according to the operating amount of the zooming dial 22 such that a variable power lens which is part of the projection lens 21 is moving for zooming. In case of zooming, moving distance of the focus lens 66 for focusing is varied. However, the focusing of the projection lens 21 can be performed because position information of the variable power lens is inputted into the CPU 52, and the CPU 52 outputs the focus signal, which is adjusted to the position information of the variable power lens, to the focus lens drive circuit 55.

The accurate distance signal must be inputted into the CPU 52 so that the projection lens 21 is focused accurately. Therefore, there is a need that the effective distance measurement light reflected from the projection surface 9 enters into the light receiving element 13. As described above, especially in case that the whiteboard is used as the projection surface 9, the diffused light from the light emitting lens 24 is strongly reflected at the whiteboard, and the reflected diffused light as the noise light is enters into the light receiving element 13 with the effective distance measurement light. This causes erroneous distance measurement. To prevent this problem, in the present invention, the light emitting optical axis 24a is inclined at the inclination angle $\theta$ with respect to the optical axis 21a of the projection lens 21.

Figure 5:
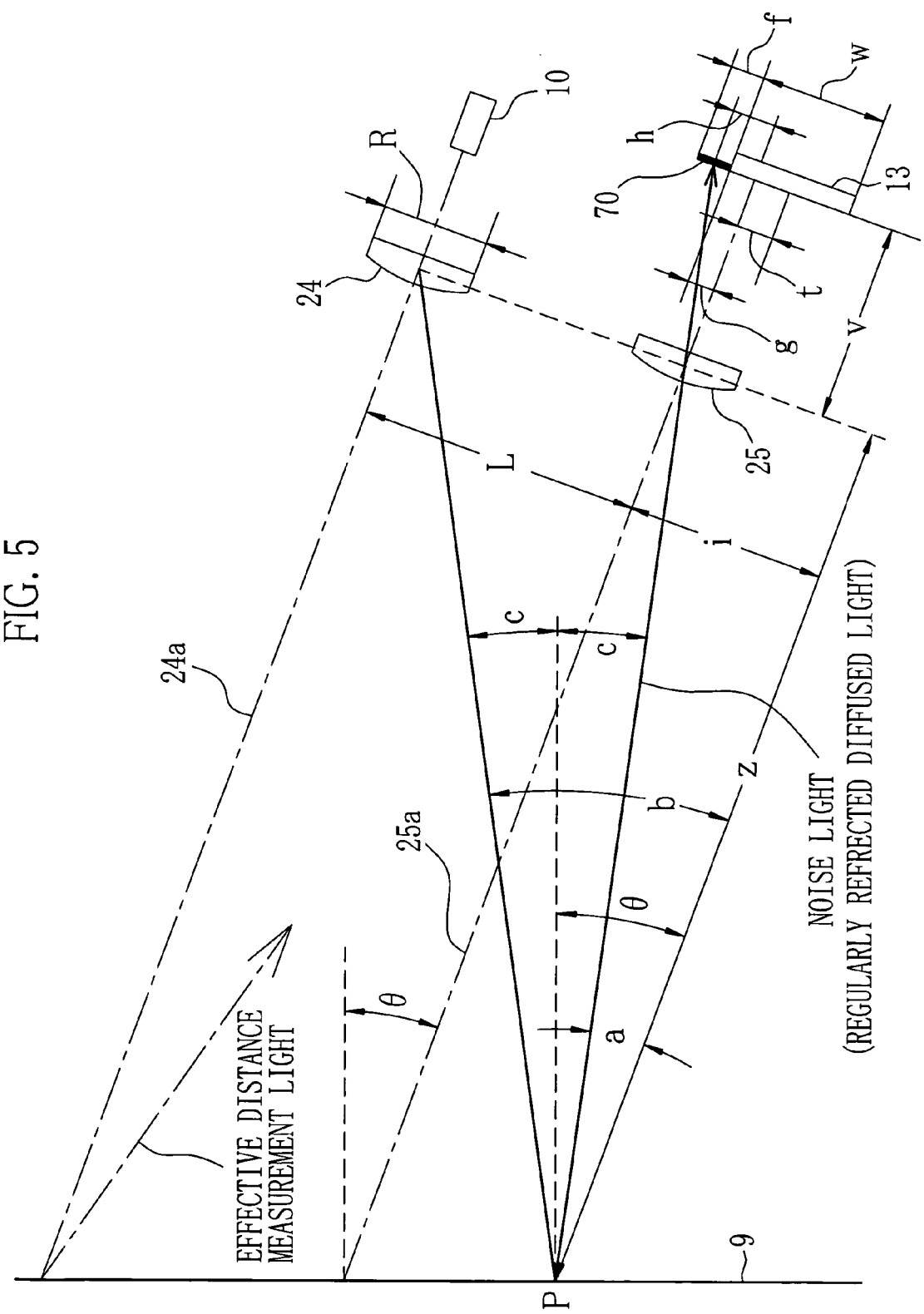
FIG. 5 is an explanatory diagram illustrating how to calculate an inclination angle θ of a light emitting optical axis.
Figure 6:
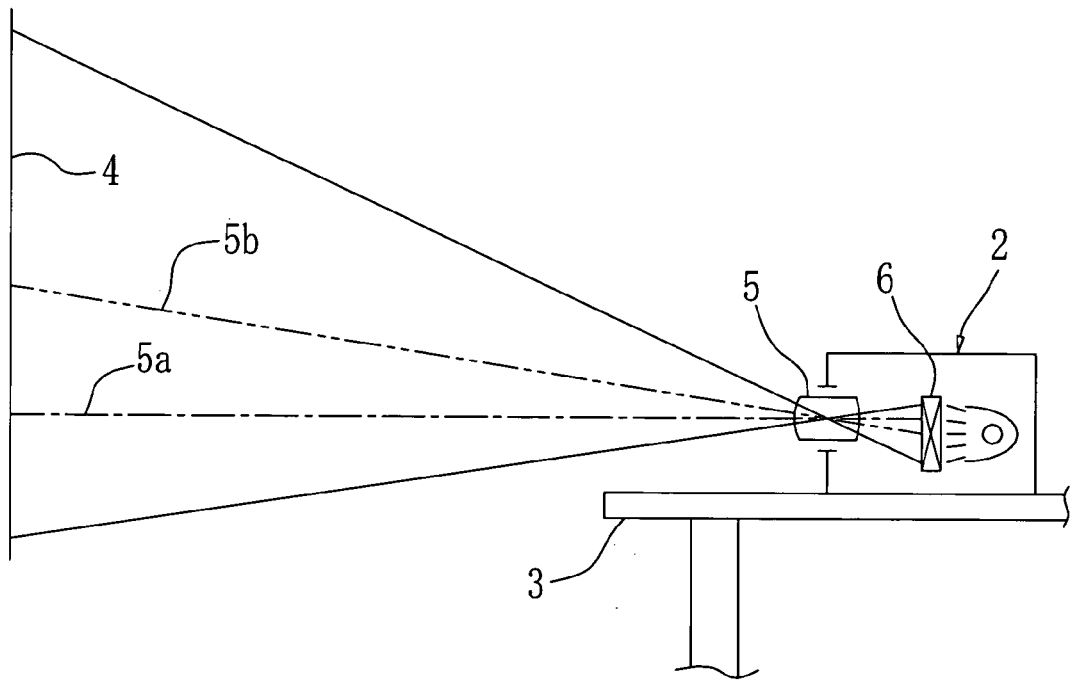
FIG. 6 is a conceptual diagram illustrating one embodiment of usage of a traditional projector.
Figure 7:
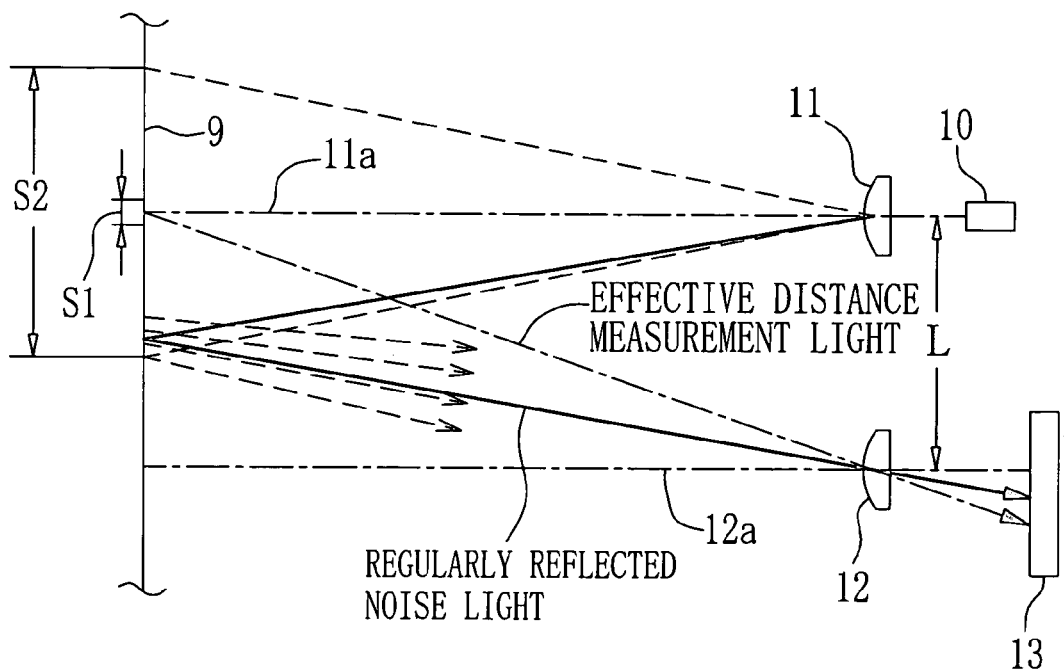
FIG. 7 is an explanatory diagram illustrating a traditional distance measurement device.
Figure 8:
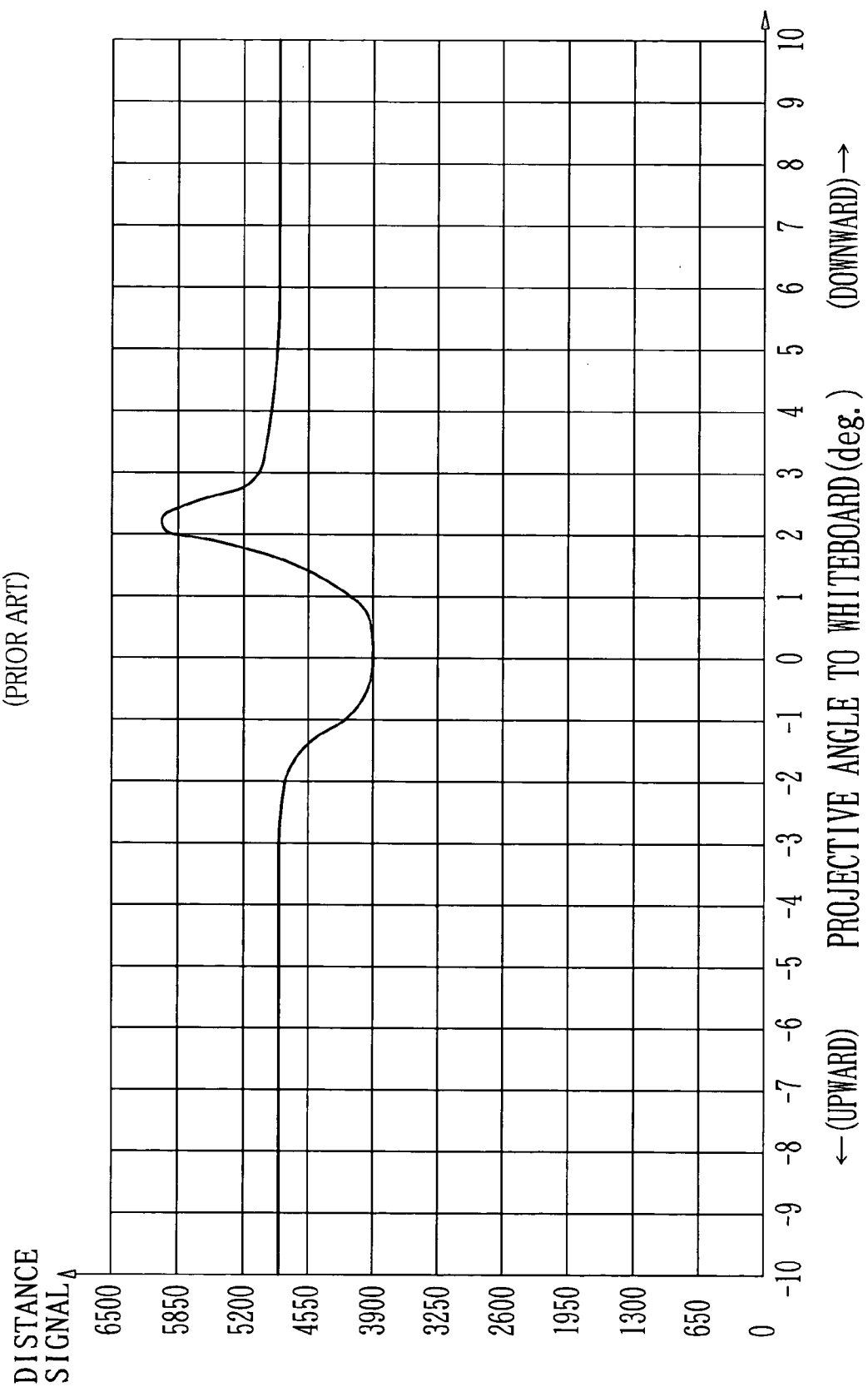
FIG. 8 is a graph illustrating variation of distance measurement signal from the distance measurement device when the traditional projector is inclined.

As shown in FIG. 5, when emitting the distance measurement light which has the light emitting optical axis 24a inclined at the inclination angle $\theta$ with respect to a virtual line perpendicular to the projection surface 9, although the noise light from the light emitting lens 24 is directly reflected at point P on the projection surface 9 and enters to the light receiving lens 25, an noise image 70 formed by the noise light regularly reflected from the point P is away from a photoelectric surface of the light receiving element 13, because the optical axis 25a of the light receiving lens 25 and the light receiving element are also inclined at the inclination angle $\theta$ as same as the light emitting lens 24.

Accordingly, the inclination angle $\theta$ for preventing erroneous distance measurement can be calculated by calculating the condition that the noise image 70 formed on an imaging surface of the light receiving lens 25 from the noise light regularly (directly) reflected from the point P is away from an effective photodetecting region of the light receiving element 13.

Each one of symbols in FIG. 5 represents as follows.
R: diameter of the light emitting lens 24
w: size of the light receiving element 13
f: size of the noise image 70
g: distance between an light emitting side end of the light receiving element 13 and the optical axis 25a *of the light receiving lens 25*
h: distance between the center of the noise image 70 and the optical axis 25a of the light receiving lens 25
t: distance between the center of the light receiving element 13 and the optical axis 25a of the light receiving lens 25
v: distance between the light receiving lens 25 and the light receiving element 13 ($\approx$focal length of the light receiving lens 25)
L: base length
Z: set distance to the projection surface 9 (the point P)
i: interval between the optical axis 25a of the light receiving lens 25 and the point P The size f of the noise image 70 on the imaging surface of the light receiving lens 25 is expressed as $[f \approx R \times (v/(z \times 2))]$ by using above symbols. In addition, an angle a is calculated as $[a = \tan^{-1}(h/v)]$, because $[g = (w/2) - t]$ and that the width h on the imaging surface, in which the noise light entered to the light receiving lens 25 from the point p at the angle a affects the distance measurement, is $[h = g + (f/2)]$. The angle a is a limit angle such that the noise light from the point P adversely affects the distance measurement.

When an interval between a perpendicular line from the point P to a line passing through centers of the light emitting and receiving lenses 24, 25 and the optical axis 25a of the light receiving lens 25 is represented as I, and an angle between the perpendicular line and a line from the point P to the center of the light emitting lens 24 is represented as b, the angle b is calculated as $[b = \tan^{-1}((L+i)/z)]$ because $[i = \tan(a) \times z]$. Because an angle c shown in FIG. 5 is calculated as $[c = (b-a)/2]$, an angle $\theta$ of a beam of noise light regularly (i.e., specularly) reflected from the point P is calculated as $[\theta = c + a]$. Accordingly, even if the diffused light from the light emitting lens 24 is regularly reflected at the projection surface 9 and enters to the light receiving lens 25, it will not enter the light receiving element while entering the lens and thus will not adversely affect the distance measurement. Rather in the situation where the light emitting optical axis 24a and the optical axis 25a of the light receiving lens 25 are both inclined at the angle $\theta$ with respect to the projection surface 9, the diffused light from the light emitting lens 24 that is regularly reflected at the projection surface 9 and that enters the light receiving lens will be incident away from the light receiving element 13.

EXAMPLE

Now a concrete example of the above angle $\theta$ is shown. When the diameter R of the light emitting lens 24 is 10 mm, the size w of the light receiving element (PSD) 13 in the direction as same as the base length is 1.2 mm, the base length L is 37.2 mm, the distance t between the center of the light receiving element 13 and the optical axis 25a of the light receiving lens 25 is 0.27 mm, the distance v between the light receiving lens 25 and the light receiving element 13 is 18.9 mm, and the distance z between the projector 2 and the point P on the projection surface 9 is 1000 mm, the size f of the noise image 70 in the direction as same as the base length becomes 0.0945 mm. Also, it is calculated that the distance g between the light emitting side end of the light receiving element 13 and the optical axis 25a of the light receiving lens 25 is 0.33 mm, the distance h between the center of the noise image 70 and the optical axis 25a of the light receiving lens 25 is 0.37725 mm, and the angle a is 1.14349°.

In addition, the angle b is 3.271485° and the angle c is 1.063997° because of distance i is 19.96032 mm. Accordingly, the angle $\theta$ becomes 2.207488°. Therefore, the erroneous distance measurement is prevented such that the noise image 70 is not formed on the photoelectric surface of the light receiving element 13, in case if the light emitting optical axis 24a is inclined at the angle $\theta$, which is 2.207488°, with respect to the optical axis 21a of the projection lens 21. It is only necessary to incline the distance measurement unit 39 at least the angle θ with no concern about the direction of the base length L, because above evaluation does not influenced by directions to incline the light emitting optical axis 24a with respect to the optical axis 21a of the projection lens 21.

For practical purposes, the angle θ is preferable to be wider than 2.5°, and is more preferable to be wider than 4°, because there may be errors of relative positions of the IRED 10 and the light emitting lens 24 and that of the light receiving lens 25 and the light receiving element 13, and there may be unsharpness of the distance measurement light and patterns of the noise light on the projection surface 9. In addition, if the angle θ become extremely wide, the distance measurement light may become away from the region for projecting the image because there become a large gap in distance between the distance measurement light and the optical axis 21a of the projection lens 21. Therefore, the angle θ should be narrower than 20° for practical purposes.

To incline the light emitting optical axis 24a, an optical axis of the light emitting lens 24 may be shifted with respect to the IRED 10 with that the optical axis of the light emitting lens 24 is parallel to the optical axis of the projection lens 21, even though that the distance measurement unit 39 is fixed to the support plate 43 such that the distance measurement unit 39 is inclined with respect to the support plate 43 as described above is easier. In general, the projector often be mounted on tables, but there is also a case that the projector is embedded in a ceiling to project the image downwardly. The present invention also can be applied to the embedment-in-ceiling type projector.

Figure 9:
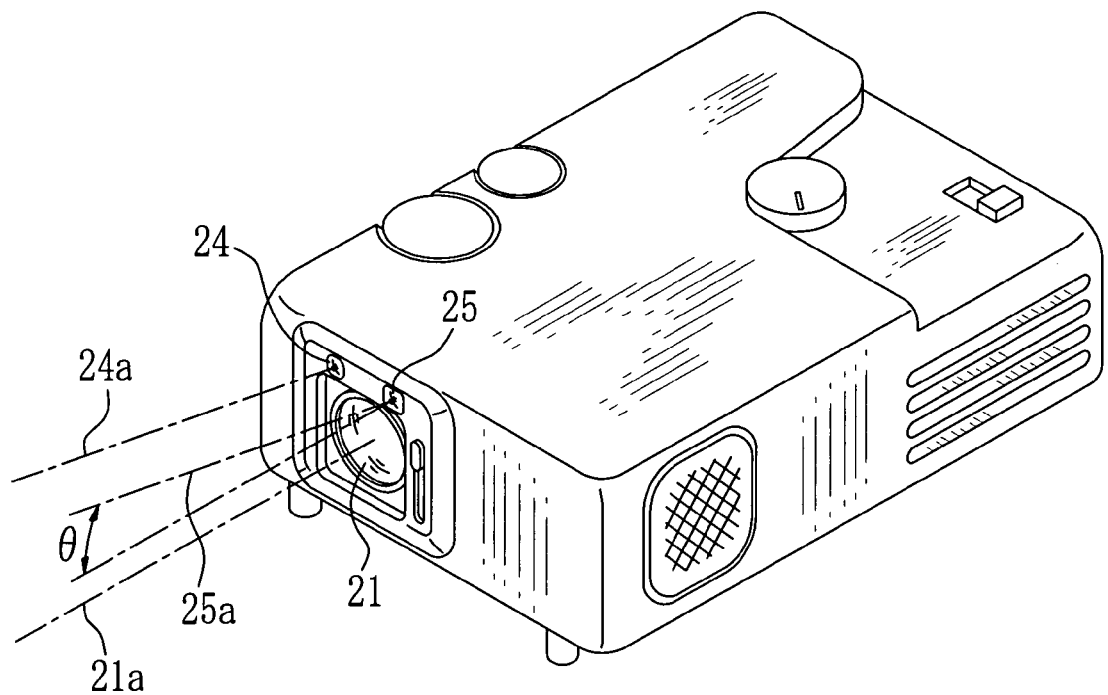
FIG. 9 is a perspective view of another projector of the present invention.
Figure 10:
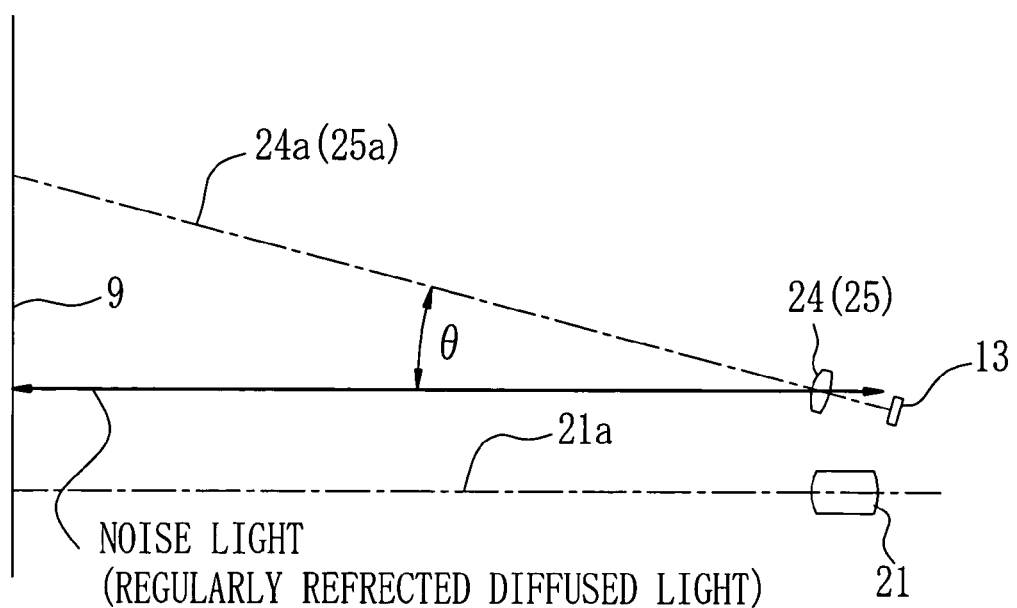
FIG. 10 is a conceptual diagram illustrating one embodiment of usage of the projector of FIG. 9.

In addition, the direction to arrange the light emitting lens 24 and the light receiving lens 25 (the direction of the base length L) is not limited to longitudinal direction shown as the above embodiment. As shown in FIG. 9, there may be a case that the light emitting lens 24 and the light receiving lens 25 are arranged in horizontal direction with respect to the mount surface, and the optical axis of the light emitting lens 24 and the optical axis 25a of the light receiving lens 25 become inclined perpendicularly upward at the inclination angle θ with respect to the optical axis 21a of the projection lens 21. In this case, as shown in FIG. 10, even if the noise light vertically entered to the projection surface 9 is regularly reflected at the projection surface 9 and enters to the light receiving lens 25, the noise light does not adversely affect the distance measurement because the light receiving element 13 is inclined upward same as the light receiving lens 25.

What is claimed is:

1. A projector for projecting an image on a projection surface through a projection lens, including an active type distance measurement device which obtains distance measurement data corresponding to a distance between said projection lens and said projection surface, said distance measurement device comprising:

a light emitting element for emitting a distance measurement light;

a light emitting lens for directing said distance measurement light from said light emitting element to said projection surface;

a light receiving lens for transmitting said distance measurement light reflected from said projection surface; and a light receiving element for receiving said distance measurement light passed through said light receiving lens, wherein an optical axis of said distance measurement light from said light emitting lens to said projection surface and an optical axis of said light receiving lens are parallel to each other and inclined a specified angle with respect to an optical axis of said projection lens such that light that is diffused in transiting the light emitting lens and specularly reflected by the projection surface does not enter said light receiving element while entering said light receiving lens.

2. A projector according to claim 1, further including an image displaying panel for displaying said original image, which is disposed between said projection lens and a projecting light source.

3. A projector according to claim 2, wherein said light emitting element, said light emitting lens, said light receiving lens, and said light receiving element are inclined with respect to an optical axis of said projection lens.

4. A projector according to claim 2, wherein said optical axis of said projection lens is perpendicular to said projection surface, the center of said image displaying panel is shifted away from said optical axis of said projection lens, and said optical axis of said distance measurement light from said light emitting lens to said projection surface and said optical axis of said light receiving lens are inclined to a direction toward a center of said projected image.

5. A projector according to claim 2, wherein said light emitting element is an infrared emitting diode, and said light receiving element is a position sensitive detector.

6. A projector according to claim 2, wherein said distance measurement device is assembled as a unit and is held with said projection lens by a common holder.

7. A projector according to claim 6, wherein said holder holds a barrel which contains said projection lens, and a support plate to which said distance measurement device are fixed, said barrel and said support plate being parallel to each other, and said distance measurement device being inclined with respect to said support plate.

8. A projector according to claim 7, further including a focus motor for focusing said projection lens and a zoom motor for zooming said projection lens, said focus motor and said zoom motor being fixed to said support plate.

9. A projector according to claim 2, wherein said optical axis of said distance measurement light from said light emitting lens to said projection surface and said optical axis of said light receiving lens are inclined with respect to the horizontal direction.

10. A projector according to claim 9, wherein said light emitting lens and said light receiving lens are arranged vertically.

11. A projector according to claim 9, wherein said light emitting lens and said light receiving lens are arranged horizontally.

* * * * *